(12) United States Patent
Abidi et al.

(10) Patent No.: US 7,054,926 B1
(45) Date of Patent: May 30, 2006

(54) METHOD AND APPARATUS FOR MANAGING NETWORK DEVICES USING A PARSABLE STRING THAT CONFORMS TO A SPECIFIED GRAMMAR

(75) Inventors: Vasmi M. Abidi, San Jose, CA (US); Hongchi Shih, Cupertino, CA (US); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 10/056,309

(22) Filed: Jan. 23, 2002

(51) Int. Cl.
*G06F 15/173* (2006.01)
(52) U.S. Cl. .................. 709/223; 709/217; 715/734; 715/736
(58) Field of Classification Search ............... 709/223, 709/224
See application file for complete search history.

(56) References Cited

U.S. PATENT DOCUMENTS

| | | | |
|---|---|---|---|
| 5,509,123 A * | 4/1996 | Dobbins et al. ............ 709/243 |
| 6,664,978 B1 * | 12/2003 | Kekic et al. ................ 715/733 |
| 2003/0074430 A1 * | 4/2003 | Gieseke et al. ............. 709/221 |
| 2003/0110250 A1 * | 6/2003 | Schnitzer et al. ........... 709/224 |
| 2003/0191829 A1 * | 10/2003 | Masters et al. ............. 709/223 |

OTHER PUBLICATIONS

D. Crocker, Ed. and P. Overell, "Augmented BNF for Syntax Specifications: ABNF" network Working Group, Nov. 1997, pp. 1-10.*
Cisco Systems, et al., "Internetworking Technologies Handbook, Third Edition," Feb. 2001, pp. 829-840, 878, 942, 952, 965, 974.
Uyless Black, "Voice Over IP," 1999, pp. 8-30.

* cited by examiner

*Primary Examiner*—Jeffrey Pwu
*Assistant Examiner*—Phuoc H. Nguyen
(74) *Attorney, Agent, or Firm*—Hickman Palermo Truong Becker LLP

(57) ABSTRACT

A method and apparatus are disclosed for managing network devices using a parsable string that conforms to a specified grammar. The parsable string is used to represent locations of entities and is called an entity location specifier. The grammar may conform to Augmented Backus-Naur Form (ABNF). The entity location specifier comprises one or more location elements taken from a superset of location elements needed to specify the locations of entities for network device platforms. The superset of location elements can include both physical and logical entities. As a result, a network management application can retrieve a description of entities and elements contained in a network device using a single request, and can receive a single string value that is parsable to identify individual entities or elements in the device.

31 Claims, 5 Drawing Sheets

303 Establish a specified grammar for location specifier values and location elements

305 Issue a retrieval request for a particular entity location specifier value to an agent

309 Receive the particular entity location specifier value

310 Process the particular entity location specifier value to determine a location of an entity

METHOD AND APPARATUS FOR MANAGING NETWORK DEVICES USING A PARSABLE STRING THAT CONFORMS TO A SPECIFIED GRAMMAR

FIELD OF THE INVENTION

The present invention generally relates to managing devices in a computer network. The invention relates more specifically to a managing devices using a parsable string that conforms to a specified grammar.

BACKGROUND OF THE INVENTION

Voice over Internet Protocol ("VoIP") networks are gaining widespread use in telecommunications. Effective operation of VoIP networks requires managing the devices that provide VoIP services. VoIP may be implemented at Layer 3 of the Open Systems Interconnect (OSI) logical network model, and therefore VoIP data packets are routable and can be carried transparently over any type of packet network infrastructure. Routers are network layer devices that are used to determine the optimal path along which network traffic, such as VoIP, can be forwarded. Routers can forward packets carrying call related data from one network to another network based on network layer information.

A challenge relating to managing devices, such as routers and the resources or entities in routers, is how to represent the wide variety of router platforms in data that can be processed by a network management software application. For example, one router platform may have 5 ports to each slot, whereas another router platform may have shelves, each shelf may have 3 slots, and each slot may have one or more sub-slots. There may be other elements that require data representation as well. For example, as data for a telephone call travels along a network infrastructure, the call related data encounters managed devices, such as routers, in the network. The call related data flows through a Digital Signal Processing (DSP) Channel on a DSP chip in the router. A particular router may have shelves, the shelves may have slots, the slots may have sub-slots, the sub-slots may have DSP chips and the DSP chips may have DSP channels. To track the call related data, ultimately routers need to store information that relates this call to the entities, e.g., shelves, slots, etc., used in the call. The problem is how to describe and represent all of these platforms in data for the purpose of device management.

Similar problems exist with respect to any association of a call and its resources (trunk, line, DSP channels and others). The calls can be modem, voice, fax or clear channel data/voice calls and are not only VoIP calls.

In devices that are managed using Simple Network Management Protocol (SNMP), one way of representing devices is with Managed Information Bases, or MIBs, which are databases hosted by the devices that contain MIB objects that represent the various characteristics and attributes of a device. For example, "chassis MIBs" often represent constituent entities of a chassis such as shelves, slots, ports, etc.

Many chassis MIBs are designed with a particular platform in mind and hence are platform dependent. A MIB that is designed for a particular platform cannot, in general, be used to manage another platform, particularly if the other platform has a different configuration of physical entities. For example, a chassis MIB designed for a router platform (hereinafter referred to as a "router MIB"), which contains slots and ports, may use two separate MIB objects—MIB slot object and MIB port object—to represent the third port in the fifth slot: In this case, the MIB port object has the value of 3 to represent the $3^{rd}$ port and the MIB slot object has a value of 5 to represent the $5^{th}$ slot. The drawback of such a design is that the same MIB cannot represent the location of physical entities on different platforms. For example, the router MIB described herein cannot be used to represent a platform with slots and sub-slots or be used to represent the locations of physical entities in a multi-chassis system. Multi-chassis systems, such as high-end router platforms, are composed of multiple chassis or "racks", each of which contain multiple slots. MIBs that represent entities of particular platforms shall hereinafter be referred to as "platform dependent MIBs".

The Entity MIB is an IETF standard (RFC 2737) that provides a platform independent way of representing physical entities in devices. The entPhysicalTable of the Entity MIB represents physical entities in the device chassis, and also indicates the containment relationship of the physical entities to the parent entity. For example, a port may be identified by an index value of 101 in the entphysical Table. Furthermore, the value of the associated MIB object entPhysicalContainedIn may indicate that the port is contained in the entry identified by value 100, which represents a slot in the chassis. Thus the various entries in the entPhysicalTable of the Entity MIB describe a hierarchical containment tree, which indicates the relationship between various physical entities in the device chassis.

However, in this approach, a network management software application is required to traverse a tree of objects in the Entity MIB to determine that 101 is the first port in slot 100. Thus, Entity MIBs are complicated and difficult to understand, and the tree traversal requirement can impose a performance impact on an application that is interacting with the Entity MIBs. Typically many queries are required to traverse the containment tree of an Entity MIB, resulting in performance degradation. Furthermore, the Entity MIB is not adequate to describe the location of a logical entity, i.e., not a physical entity, such as a DSP channel or a logical network interface.

Based on the forgoing, there is a clear need for a mechanism to indicate, in a platform independent manner, the location of both physical and logical managed entities within a managed device. Furthermore, there is a need to manage both physical and logical entities.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for managing devices using a parsable string that conforms to a specified grammar to provide platform independent management. In a second aspect, the parsable string is used to represent locations of entities. This parsable string is called an entity location specifier. In a third aspect, the specified grammar conforms to Augmented Backus-Naur Format, or ABNF. In a fourth aspect, the entity location specifier comprises one or more location elements taken from a superset of location elements needed to specify the locations of all entities for all known platforms. In a fifth aspect, the superset of location elements can be used to represent all known physical entities and logical entities. In a sixth aspect, the specified grammar is used to define MIB objects. In a seventh aspect, a particular entity location specifier value can be retrieved in a single request.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3b is a flowchart of application logic of a network management system; and

DETAILED DESCRIPTION OF THE PREFERRED EMBODIMENT

A method and apparatus for managing devices using a parsable string that conforms to a specified grammar is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 TECHNICAL OVERVIEW
2.0 A PARSABLE STRING THAT CONFORMS TO A SPECIFIED GRAMMAR
3.0 MIB CALL RECORDS
4.0 AN OPERATIONAL EXAMPLE
5.0 IMPLEMENTATION MECHANISMS -- HARDWARE OVERVIEW
6.0 EXTENSIONS AND ALTERNATIVES 1.0 Technical Overview Techniques are provided for managing network devices using a parsable string that conforms to a specified grammar. As a result, platform independent management is achieved. In one aspect, a parsable string, which conforms to a specified grammar, is used to represent locations of entities within a network device. In one embodiment, the parsable string is termed an entity location specifier. In a second aspect, a grammar that conforms to Augmented Backus-Naur Form ("ABNF") is used as the specified grammar. In a third aspect, the entity location specifier comprises one or more location elements selected from an extensible plurality of location elements that specify the locations of all entities for all known platforms. In a fourth aspect, the location elements can be used to represent all known physical entities and logical entities. In a fifth aspect, the specified grammar is used to define MIB objects. In a sixth aspect, a particular entity location specifier value can be retrieved in a single request.

Certain embodiments provide a platform independent representation of entities that make up network devices; the ability to represent both physical entities and logical entities with one grammar; a human-readable naming convention that is compatible with Command Line Interpreter (CLI); entity location determination without traversing the containment tree of an Entity-MIB; and, an extensible and flexible grammar.

Figure 1:
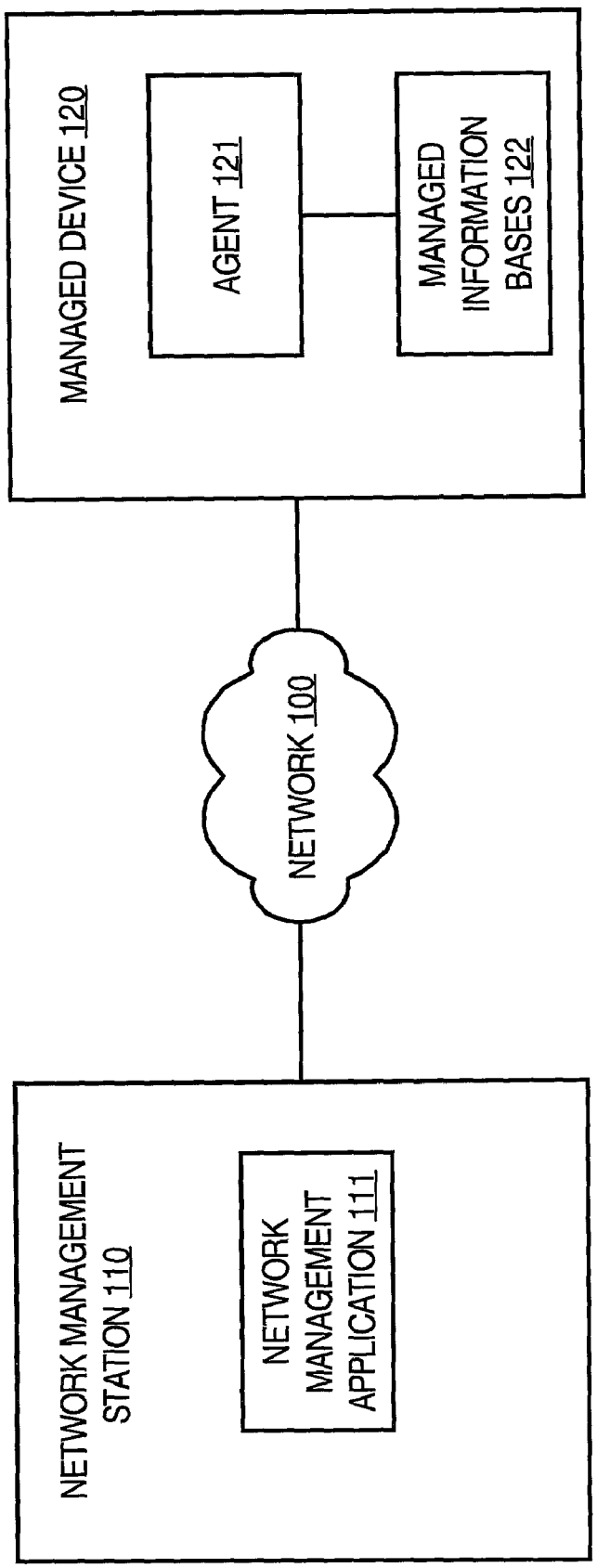
FIG. 1 is a block diagram of an example managed network.

FIG. 1 is a block diagram of an example managed network. A network management system 110 is communicatively coupled through network 100 to a managed device 120. In one embodiment, network 100 is a packet voice network that carries voice over Internet Protocol (VoIP) packets. Network management system 110 provides network management functions such as call control and call management through a network management application 111 hosted on the network management system. Managed device 120 is a network infrastructure element such as a router, switch, gateway, hub, etc., and executes an agent 121 that manages data in one or more management information bases ("MIBs") 122.

In one example embodiment, device 120 is managed using the Simple Network Management Protocol (SNMP). An agent 121 has local knowledge of management information, such as MIBS 122, and translates that information into a form compatible with SNMP. SNMP is an application-layer protocol that facilitates exchange of management information between managed devices. Using SNMP-transported data, such as MIB objects in MIBs 122, network administrators can more easily manage network performance, configure and provision network devices, find and solve network problems, and plan for network growth. A network manager using a Network Management Station 110 (NMS) will invoke features of network management application 111 that use SNMP to retrieve or modify information about status or configuration of managed device 120, or to track network statistics and resources.

For purposes of illustrating a simple example, FIG. 1 shows one managed device 120; however, in a practical network, there may be any number of managed devices.

As data for a telephone call travels through network 100 it pass through one or more managed devices 120. The call data eventually flows through a DSP channel on a DSP chip in a router. A particular router may have shelves, the shelves may have slots, the slots may have sub-slots, the sub-slots may have DSP chips and the DSP chips may have DSP channels. To track the call related data, network management application 111 needs to access information that relates a call to the entities, e.g., shelves, slots, etc., used in the call.

One mechanism for storing call related information is MIB-call-records that are contained in MIBs 122. However, representing the location of call related resources in MIB-call-records poses problems. One way to indicate the location of call related resources is to refer to the chassis MIB of a managed device. However, this has drawbacks: one, referring to the chassis MIB requires the use of multiple MIB objects to fully specify the location of the call related resources; two, the representation is platform dependent and hence is not suitable for different kinds of managed devices.

If the MIB-call-record references the Entity MIB in order to indicate the location of the call related entities, then the MIB-call-record can only reference those entities that are represented in the Entity MIB. As already discussed, the Entity MIB cannot be used to represent the location of logical entities.

2.0 A Parsable String That Conforms to a Specified Grammar

According to one aspect, entity locations are specified using a parsable string that conforms to a specified grammar. According to one embodiment, the specified grammar conforms to ABNF, which is defined in Request for Comments (RFC) 2234 of the Internet Engineering Task Force.

The grammar supports entity location information for all physical entities and logical entities for all known platforms, and is extensible, and is therefore platform-independent. Location elements represent the locations of all currently known physical entities and logical entities. In one embodiment, the location elements are:

chassis=value
   where the value represents the chassis location
shelf=value
   where the value represents the shelf location
slot=value
   where the value represents the slot location
subSlot=value
   where the value represents the subSlot location
channel=value
   where the value represents the channel location
subChannel=value
   where the value represents the subChannel location.
processor=value
   where the value represents a processor identifier, so that multiple CPUs in a slot or sub-slot can be uniquely identified.

Entity locations are represented in MIB objects. According to one aspect, two textual conventions are used in conjunction to define MIB objects that represent entity locations. The first textual convention is a location specifier and a second textual convention specifies location type. Location type values are referenced in the first textual convention. In one embodiment, a grammar of the first textual convention, which is used for a location specifier, is defined as in Table 1:

TABLE 1
LOCATION SPECIFIER

LocationSpecifier ::= TEXTUAL-CONVENTION
STATUS current
DESCRIPTION
   "use this textual convention to define MIB objects that indicate the physical entity and/or logical entity location."
   location-specifier = elem * (',' elem)
     ; subject to
     ; size restriction specified in the syntax
     ; clause below
   elem = loctype '=' number
   number = %x00-FFFFFFFF/%d0-4294967295
   loctype = 1*32VCHAR In Table 1, the line "elem=loctype '=' number" is a reference to the second textual convention that defines a location type. In one embodiment, a grammar of the second textual convention for location type is defined as in Table 2:

TABLE 2
LOCATION TYPE

LocationClass ::= TEXTUAL-CONVENTION
  STATUS current
  DESCRIPTION
    "An enumerated value that provides the location information of a particular physical or logical entity.
    chassis - a system framework for mounting one or more shelves/-slots/cards.
    shelf - a cabinet that holds one or more slots.
    slot - a card or subSlot holder.
    port - a physical port (e.g., a DS1 or DS3 physical port).
    subPort - a logical port on a physical port (e.g., a DS1 subPort on a DS3 physical port).
    channel - a logical entity (e.g., a DS0 channel, signaling channel, ATM port, other virtual interface).
    subChannel - a subchannel on a logical entity.
    processor - a processor on a card that is held by a slot or subSlot.
"
  SYNTAX INTEGER {
    chassis(1),
    shelf(2),
    slot(3),
    subSlot(4),
    port(5),
    subPort(6),
    channel(7),
    subChannel(8),
    processor(9) }

The textual conventions of Table 1 and Table 2 can be used, for example, to define a MIB object representing the third port in the fifth slot of a managed device with the following location specifier value:

"slot=5, port=3".

Using a parsable string having a syntax that conforms to the grammar defined in Table 1 and Table 2, any known physical entity or logical entity can be represented with the grammar.

Furthermore, the grammar is flexible and extensible in the event that new entities are added in the future. In the example above, the last entity defined in the grammar is subChannel, at position 8. However, new entities are easily added by defining them in the grammar at positions 9, 10, 11, and so forth.

The specified grammar is human readable and is intuitively related to the naming conventions used for entities in CLI. CLI is a console-based user interface that allows users to issue commands and to display the status and/or configuration of devices. For example, a CLI command that relates to information about the third port in the fifth slot of a router is entered by a user in the format "5/3", which is intuitively related to the expression "slot=5, port=3".

Further, the grammar described herein does not require traversal of a hierarchical containment tree to ascertain entity information. An expression in the specified grammar that designates the third port in the fifth slot as "slot=5, port=3" is directly translatable into the CLI format of "5/3".

Furthermore, since a parsable string, which is a value in a single MIB object, conforms to a specified grammar, all the information necessary for locating an entity can be retrieved in a single programmatic call that returns a string value. Parsing the string enables an application program to fully derive the location value for an entity in a device. The many SNMP queries required to traverse the containment tree of an Entity MIB are avoided, which results in a significant performance enhancement.

3.0 MIB Call Records

Figure 2:
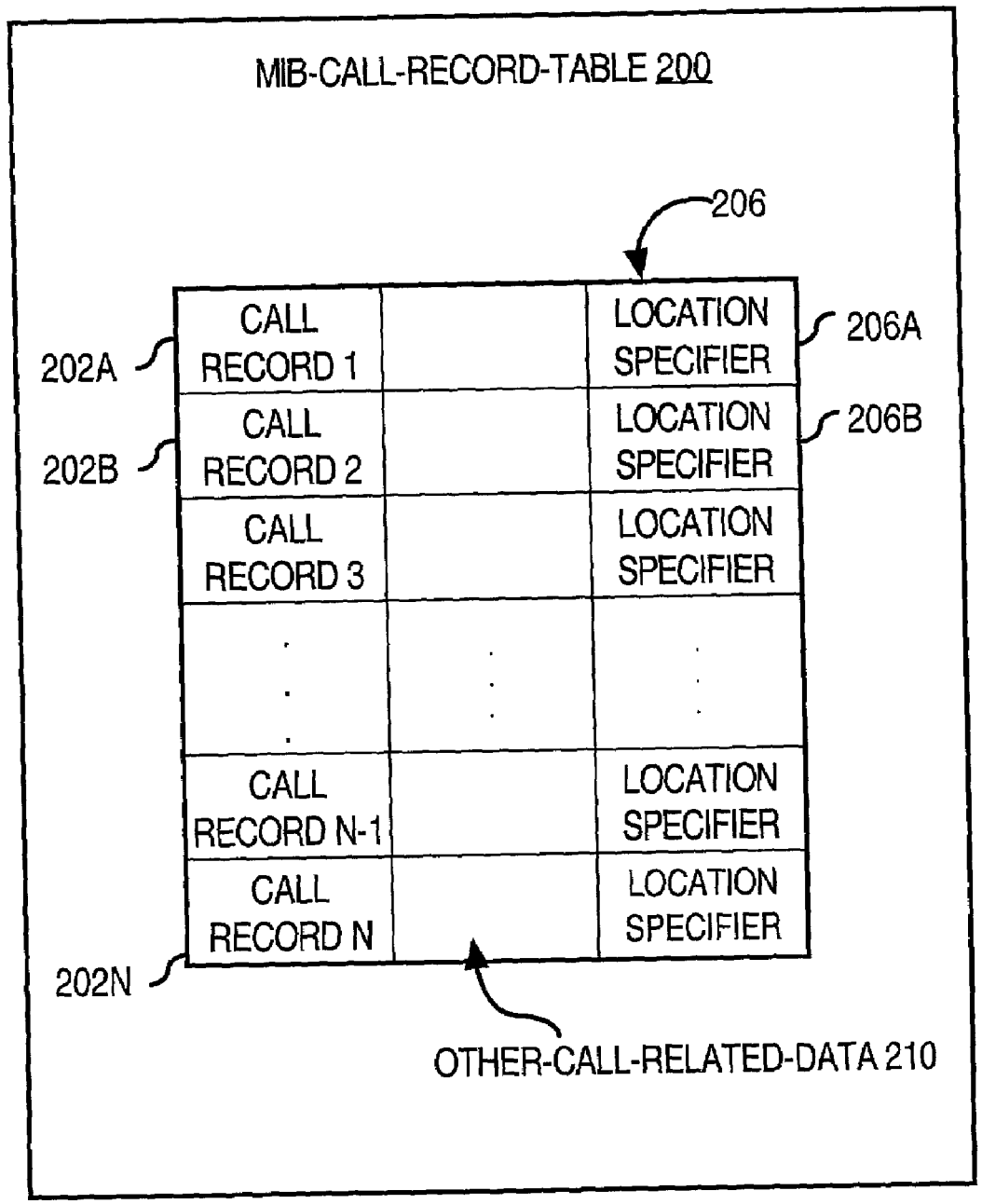
FIG. 2 is a block diagram of a MIB-call-record-table.

Location identifiers as defined herein are efficiently stored with other call related information in a MIB having MIB-call-records. FIG. 2 depicts a block diagram of a MIB-call-record-table containing a plurality of MIB-call-records. MIB-call-record-table 200 contains one or more MIB-call-records 202A, 202B, 202N, etc., stored for one or more VoIP calls.

The MIB-call-record-table 200 has a column 206 for location specifier values that conform to the specified grammar described herein. Therefore, a particular location specifier value is associated with a particular MIB-call-record. For example, a first location specifier 206A is associated with a first MIB-call-record 202A. Furthermore, MIB-call-records 202A, 202B, 202N, etc., also can contain other call-related data 210.

For purposes of illustrating an example, assume that MIB call record table 200 represents call records processed by a router that has multiple shelves, the shelves have multiple slots, the slots have multiple ports, and the ports have multiple DSP channels. In this arrangement, MIB-call-record 202A, for example, may contain a location specifier value 206A of "shelf=2, slot=5, port=3" to specify a particular port used in the call. MIB-call-record 202B, for example, may contain a location specifier value 206B of "shelf=2, slot=5, port=3, channel=2" to specify the second DSP channel in the same port.

4.0 An Operational Example

Figure 3A:
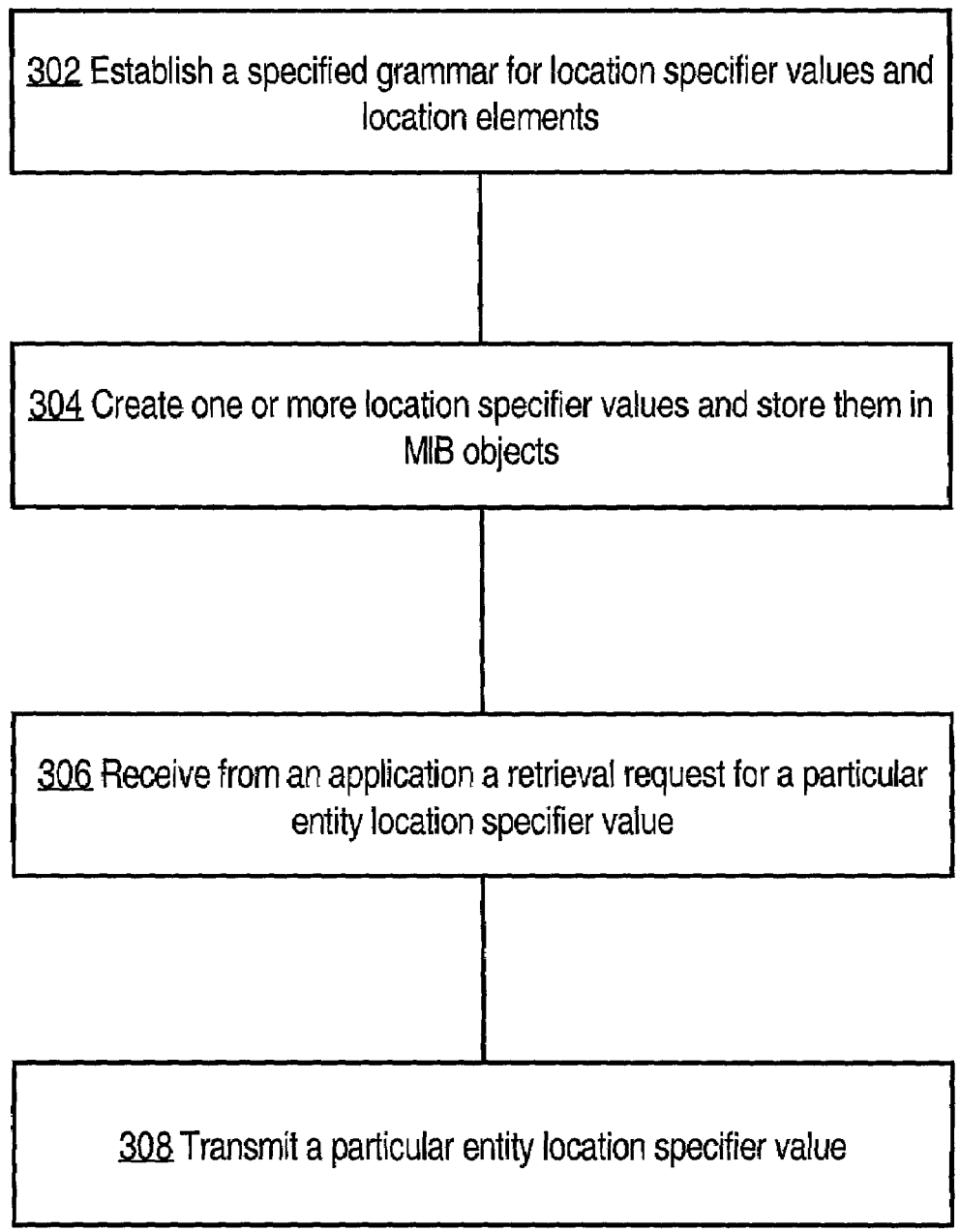
FIG. 3a is a flowchart of agent logic on a managed device.

FIG. 3A is a flowchart of example logic for an agent running on a managed device, such as a router. FIG. 3B is a flowchart of example logic for an application, such as an NMA running on a network management system.

Referring first to FIG. 3A, at step 302, a specified grammar is established for one or more location specifier values and location elements. As a part of step 302, logic may be programmed into an SNMP agent of a router or other network device to manage MIB objects containing location specifiers that conform to the specified grammar.

At step 304, one or more location specifier values are created and stored in MIB objects. For example, creating and storing location specifier values may occur by storing one or more call records in a call record table in response to a phone call.

At step 306, an agent receives a retrieval request for the particular entity location specifier from an application. For example, network management application 111 issues an SNMP request to agent 121 of managed device 120 that requests the managed device to provide a location specifier value that is associated with a particular call record in a call record table 200 of MIBs 122. In response, at step 308, the agent retrieves the particular entity location specifier and transmits it to the requesting application. For example, agent 121 locates the requested location specifier value in a call record of the call record table of MIBs 122 and returns the location specifier value as a string value to the requesting application in an appropriate response message.

Referring now to FIG. 3B, in step 303, a specified grammar is established for one or more location specifier values and location elements. As a part of step 303, a parser may be implemented in association with an application, an application server, a network management system, etc., to parse entity location specifier values in conformance with the specified grammar.

At step 305, a retrieval request for an entity location specifier is issued. For example, a network management application issues an SNMP message to a managed device, in which the message requests the entity location specifier associated with a particular call record of a MIB. Step 305 may be performed in response to an action taken by a network manager entering requests at network management station where the network management application is running.

At step 309, the particular entity location specifier value is received. For example, a network management application receives an entity location specifier value conforming to the specified grammar in the form of a string in a response message from an SNMP agent of a managed device. At step 310, the network management application processes the particular entity location specifier value to determine a location of an entity. As a part of processing the particular entity location specifier value, a parser that conforms to a specified grammar may be used to parse a received string value and identify individual values that identify a chassis, port, interface, channel, or other entities.

The techniques described herein may provide platform independent representation of entities; the ability to represent both physical entities and logical entities with one grammar; a human-readable naming convention that is consistent with CLI; an automated parser in Network Management Systems; entity location determination without traversing the containment tree of an Entity-MIB; and, an extensible and flexible grammar.

Platform independent representation of entities is provided by using an entity location specifier that conforms to a specified grammar. Furthermore, a platform independent representation is accomplished using by an entity location specifier that comprises one or more location elements taken from a superset of location elements that specify the locations of all entities for all platforms.

The ability to represent both physical entities and logical entities is accomplished by including in the superset of location elements, location information needed to represent physical entities and logical entities.

A human-readable naming convention that is compatible with CLI is accomplished by providing a parsable string that conforms to a specified grammar.

A particular entity location specifier value can be retrieved in a single request because all the information necessary to specify a particular entity's location can be specified in a single parsable string rather than in a containment tree.

5.0 Implementation Mechanisms—Hardware Overview

Figure 4:
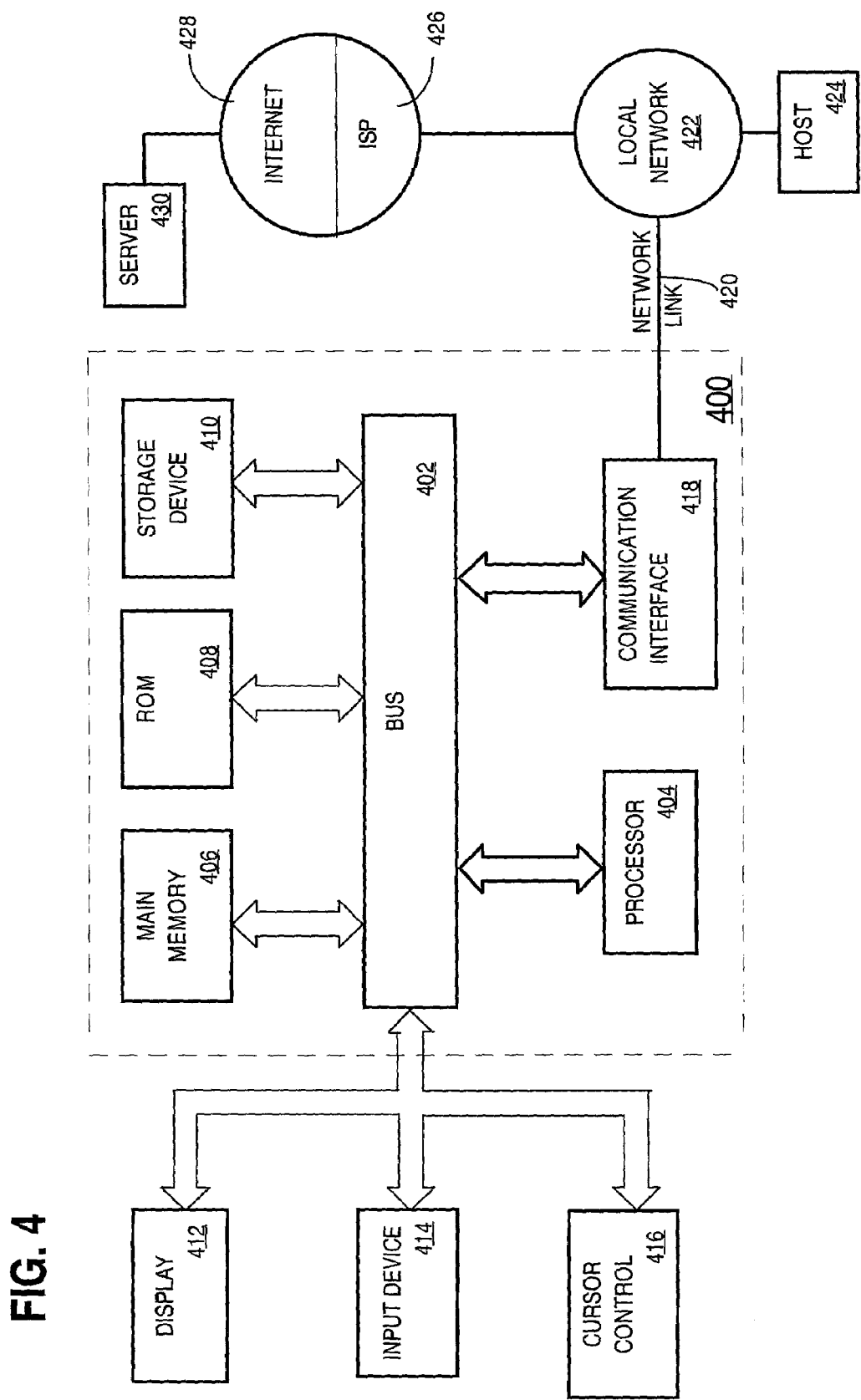
FIG. 4 is a block diagram that illustrates a computer system upon which embodiments of the invention may be implemented.

FIG. 4 is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for managing devices using a parsable string that conforms to a specified grammar to provide platform independent management. According to one embodiment of the invention, managing devices using a parsable string that conforms to a specified grammar to provide platform independent management is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for managing devices using a parsable string that conforms to a specified grammar to provide platform independent management as described herein.

Processor 404 may execute the received code as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Although the techniques herein are described in the context of using VoIP with routers, agents, a network management system, and a network management application, these techniques are not limited to this context. These techniques can be used to specify any entity location that network data uses and an association of the network data with that entity location. These techniques can be used not only for identifying failure points but also for managing resources and gather statistics among other things.

What is claimed is:

1. A method of managing network devices by specifying device components using a parsable string that conforms to a specified grammar, the method comprising the computer steps of:

creating and storing one or more entity location specifier values each comprising one or more location elements;

wherein the one or more entity location specifier values are specified as parsable strings;

wherein the parsable strings conform to the specified grammar;

wherein the specified grammar defines one or more delimited location specifiers, wherein each location specifier specifies a location type and a number:

wherein the parsable strings are stored in Managed Information Base (MIB) objects and wherein the one or more entity location specifier values are specified as the parsable strings in the MIB objects;

wherein each of the one or more location elements is selected from a superset of location elements that specify locations of entities within one or more network devices;

receiving from an application a retrieval request for a particular entity location specifier value; and transmitting the particular entity location specifier value to the application.

2. A method as recited in claim 1 wherein a particular location element of the one or more location elements is selected from among the group consisting of chassis=value, shelf=value, slot=value, subSlot=value, port=value, subPort=value, channel=value, subChannel=value, and processor=value.

3. A method as recited in claim 1 wherein the step of transmitting further comprises the step of transmitting the particular entity location specifier value to the application in a single response.

4. A method as recited in claim 1 wherein the one or more entity location specifier values contain location elements that identify both logical entities and physical entities.

5. A method as recited in claim 1 wherein the one or more entity location specifier values are stored in MIB-call-records on specifier values in said MIB.

6. A method as recited in claim 1 wherein the superset of location elements is extensible.

7. A method as recited in claim 1 wherein the specified grammar is compatible with Command Line Interface.

8. A method as recited in claim 1 wherein the specified grammar is defined according to Augmented Backus-Naur Form (ABNF).

9. A method as recited in claim 8 wherein the grammar is defined as:

location-specifier=elem*(',' elem)
elem=loctype '=' number
number=% x00-FFFFFFFF/% d0-4294967295
loctype=1*32VCHAR.

10. A method as recited in claim 9 wherein the "loctype" defined within the grammar is an enumerated value that provides location information of a particular physical or logical entity selected from the set consisting of chassis, shelf, slot, port, sub-port, channel, and sub-channel.

11. A method as recited in claim 1 wherein the parsable strings conform to a first textual convention and a second textual convention.

12. A method of managing network devices by specifying device components using a parsable string that conforms to a specified grammar to provide platform independent management, the method comprising the computer-implemented steps of:

issuing a retrieval request for a particular entity location specifier value to an agent on a network device;

wherein the particular entity location specifier value is specified as the parsable string;

wherein the particular entity location specifier value comprises one or more location elements;

wherein the parsable string conforms to the specified grammar;

wherein the specified grammar defines one or more delimited location specifiers wherein each location specifier specifies a location type and a number;

wherein the parsable strings are stored in Managed Information Base (MIB) objects and wherein the one or more entity location specifier values are specified as the parsable strings in the MIB objects;

wherein each of the one or more location elements is selected from a superset of location elements that specify locations of all entities within one or more network devices;

receiving the particular entity location specifier value; and processing the particular entity location specifier value to determine a location of an entity.

13. A method as recited in claim 12 wherein a particular location element of the one or more location elements is selected from among the group consisting of chassis=value, shelf=value, slot=value, subSlot=value, port=value, subPort=value, channel=value, and subChannel=value.

14. A method as recited in claim 12, wherein the step of receiving further comprises the step of receiving the particular entity location specifier value in a single response.

15. A method as recited in claim 12 wherein the particular entity location specifier value comprising the one or more location elements that identify both logical entities and physical entities.

16. A method as recited in claim 12 wherein the superset of location elements is extensible.

17. A method as recited in claim 12 wherein the specified grammar is compatible with Command Line Interpreter.

18. A method as recited in claim 12 wherein the specified grammar is defined according to Augmented Backus-Naur Form (ABNF).

19. A method as recited in claim 18 wherein the grammar is defined as:

location-specifier=elem*(',' elem)
elem=loctype '=' number
number=% x00-FFFFFFFF/% d0-4294967295
loctype=1*32VCHAR.

20. A method as recited in claim 19 wherein the loctype defined within the grammar is an enumerated value that provides location information of a particular physical or logical entity selected from the set consisting of chassis, shelf, slot, port, sub-port, channel, and sub-channel.

21. A method as recited in claim 12 wherein the parsable string conforms to a first textual convention and a second textual convention.

22. A method as recited in claim 12 wherein the step of processing further comprises the step of parsing the parsable string to determine the one or more location elements.

23. A computer-readable medium carrying a data structure used in managing network devices by specifying device components using a parsable string that conforms to a specified grammar to provide platform independent management, comprising:
  a location specifier value comprising one or more location elements;
    wherein the grammar defines one or more delimited location specifiers, wherein each location specifier specifies a location type and a number:
    wherein the parsable strings are stored in Managed Information Base (MIB) objects and wherein the one or more entity location specifier values are specified as the parsable strings in the MIB objects;
    wherein the location specifier value is specified as the parsable string that conforms to the specified grammar;
    wherein the one or more location elements are selected from a superset of location elements that specify locations of all entities within one or more network devices; and
    wherein the parsable string can be retrieved from the MIB object with a retrieval request.

24. A computer-readable medium carrying one or more sequences of instructions for managing network devices by specifying device components using a parsable string that conforms to a specified grammar to provide platform independent management, which instructions, when executed by one or more processors, cause the one or more processors to carry out the steps of:
  creating and storing one or more entity location specifier values each comprising one or more location elements;
    wherein the one or more entity location specifier values are specified as parsable strings;
    wherein the parsable strings conform to the specified grammar;
    wherein the specified grammar defines one or more delimited location specifiers, wherein each location specifier specifies a location type and a number:
    wherein the parsable strings are stored in Managed Information Base (MIB) objects and wherein the one or more entity location specifier values are specified as the parsable strings in the MIB objects;
    wherein each of the one or more location elements is selected from a superset of location elements that specify locations of all entities within one or more devices;
  receiving from an application a retrieval request for a particular entity location specifier value; and
  transmitting the particular entity location specifier value to the application.

25. A computer-readable medium carrying one or more sequences of instructions for managing network devices by specifying device components using a parsable string that conforms to a specified grammar to provide platform independent management, when executed by one or more processors, cause the one or more processors to carry out the steps of:
  issuing a retrieval request for a particular entity location specifier value to an agent on a network device;
    wherein the particular entity location specifier value is specified as the parsable string;
    wherein the particular entity location specifier value comprises one or more location elements;
    wherein the parsable string conforms to the specified grammar;
    wherein the specified grammar defines one or more delimited location specifiers, wherein each location specifier specifies a location type and a number;
    wherein the parsable strings are stored in Managed Information Base (MIB) objects and wherein the one or more entity location specifier values are specified as the parsable strings in the MIB objects;
    wherein each of the one or more location elements is selected from a superset of location elements that specify locations of all entities within one or more network devices;
  receiving the particular entity location specifier value; and
  processing the particular entity location specifier value to determine a location of an entity.

26. An apparatus for managing network devices by specifying device components using a parsable string that conforms to a specified grammar to provide platform independent management, comprising:
  means for creating and storing one or more entity location specifier values each comprising one or more location elements;
    wherein the one or more entity location specifier values are specified as parsable strings;
    wherein the parsable strings conform to the specified grammar;
    wherein the specified grammar defines one or more delimited location specifiers, wherein each location specifier specifies a location type and a number;
    wherein the parsable strings are stored in Managed Information Base (MIB) objects and wherein the one or more entity location specifier values are specified as the parsable strings in the MIB objects;
    wherein each of the one or more location elements is selected from a superset of location elements that specify locations of all entities within one or more network devices;
  means for receiving from an application a retrieval request for a particular entity location specifier value; and
  means for transmitting the particular entity location specifier value to the application.

27. An apparatus for managing network devices by specifying device components using a parsable string that conforms to a specified grammar to provide platform independent management, comprising:
  a network interface that is coupled to a data network for receiving one or more packet flows therefrom;
  a processor;
  one or more stored sequences of instructions which, when executed by the processor, cause the processor to carry out the steps of:
  creating and storing one or more entity location specifier values each comprising one or more location elements;
    wherein the one or more entity location specifier values are specified as parsable strings;
    wherein the parsable strings conform to the specified grammar;
    wherein the specified grammar defines one or more delimited location specifiers, wherein each location specifier specifies a location type and a number;
    wherein the parsable strings are stored in Managed Information Base (MIB) objects and wherein the one or more entity location specifier values are specified as the parsable strings in the MIB objects;
    wherein each of the one or more location elements is selected from a superset of location elements that specify locations of all entities within one or more network devices;
  receiving from an application a retrieval request for a particular entity location specifier value; and transmitting the particular entity location specifier value to the application.

28. An apparatus for managing network devices by specifying device components using a parsable string that conforms to a specified grammar to provide platform independent management, comprising:
    means for issuing a retrieval request for a particular entity location specifier value to an agent on a network device;
        wherein the particular entity location specifier value is specified as the parsable string;
        wherein the particular entity location specifier value comprises one or more location elements;
        wherein the parsable string conforms to the specified grammar;
        wherein the specified grammar defines one or more delimited location specifiers, wherein each location specifier specifies a location type and a number;
        wherein the parsable strings are stored in Managed Information Base (MIB) objects and wherein the one or more entity location specifier values are specified as the parsable strings in the MIB objects;
        wherein each of the one or more location elements is selected from a superset of location elements that specify locations of all entities within one or more network devices;
    means for receiving the particular entity location specifier value; and
    means for processing the particular entity location specifier value to determine a location of an entity.

29. An apparatus for managing network devices by specifying device components using a parsable string that conforms to a specified grammar to provide platform independent management, comprising:
    a network interface that is coupled to a data network for receiving one or more packet flows therefrom;
    a processor;
    one or more stored sequences of instructions which, when executed by the processor, cause the processor to carry out the steps of:
    issuing a retrieval request for a particular entity location specifier value to an agent on a network device;
        wherein the particular entity location specifier value is specified as the parsable string;
        wherein the particular entity location specifier value comprises one or more location elements;
        wherein the parsable string conforms to the specified grammar;
        wherein the specified grammar defines one or more delimited location specifiers, wherein each location specifier specifies a location type and a number,
        wherein the parsable strings are stored in Managed Information Base (MIB) objects and wherein the one or more entity location specifier values are specified as the parsable strings in the MIB objects;
        wherein each of the one or more location elements is selected from a superset of location elements that specify locations of all entities within one or more network devices;
    receiving the particular entity location specifier value; and
    processing the particular entity location specifier value to determine a location of an entity.

30. A method of managing network devices by specifying device components using a parsable string that conforms to a specified grammar to provide platform independent management, the method comprising the computer steps of:
    creating and storing one or more entity location specifier values each comprising one or more location elements;
        wherein the one or more location elements are for logical entities and physical entities;
        wherein the one or more entity location specifier values are specified as parsable strings in Managed Information Base (MIB) objects;
        wherein the parsable strings conform to Augmented Backus-Naur Form (ABNF);
        wherein the specified grammar defines one or more delimited location specifiers, wherein each location specifier specifies a location type and a number;
        wherein each of the one or more location elements is selected from a superset of location elements that specify locations of all entities within one or more network devices;
    receiving from an application a single retrieval request for a particular entity location specifier value; and
    transmitting the particular entity location specifier value to the application in a single response.

31. A method of managing network devices by specifying device components using a parsable string that conforms to a specified grammar to provide platform independent management, the method comprising the computer-implemented steps of:
    issuing a single retrieval request for a particular entity location specifier value to an agent on a network device;
        wherein the particular entity location specifier value is specified as the parsable string;
        wherein the particular entity location specifier value comprises one or more location elements;
        wherein the one or more location elements are for logical entities and physical entities;
        wherein the parsable string conforms to Augmented Backus-Naur Form (ABNF);
        wherein the specified grammar defines one or more delimited location specifiers wherein each location specifier specifies a location type and a number,
        wherein the parsable strings are stored in Managed Information Base (MIB) objects and wherein the one or more entity location specifier values are specified as the parsable strings in the MIB objects;
        wherein each of the one or more location elements is selected from a superset of location elements that specify locations of all entities within one or more network devices;
    receiving the particular entity location specifier value in a single response; and
    processing the particular entity location specifier value to determine a location of an entity.

* * * * *

UNITED STATES PATENT AND TRADEMARK OFFICE
CERTIFICATE OF CORRECTION

PATENT NO. : 7,054,926 B1
APPLICATION NO. : 10/056309
DATED : May 30, 2006
INVENTOR(S) : Vasmi M. Abidi et al.

It is certified that error appears in the above-identified patent and that said Letters Patent is hereby corrected as shown below:

Column 13
Claim 24: Line 37, delete "number:" and insert --number;--.

Column 15
Claim 29: Line 51, delete "number," and insert --number;--.

Column 16
Claim 31: Lines 45-46, delete "specifiers wherein each location specifier specifies a location type and a number," and insert -- specifiers, wherein each location specifier specifies a location type and a number;--.

Signed and Sealed this

Twenty-second Day of August, 2006

JON W. DUDAS
*Director of the United States Patent and Trademark Office*